United States Patent
Sasaki et al.

(10) Patent No.: US 11,811,143 B2
(45) Date of Patent: Nov. 7, 2023

(54) OAM MULTIPLEXING COMMUNICATION SYSTEM AND INTER-MODE INTERFERENCE ELIMINATION METHOD

(71) Applicant: NIPPON TELEGRAPH AND TELEPHONE CORPORATION, Tokyo (JP)

(72) Inventors: Hirofumi Sasaki, Yokosuka (JP); Doohwan Lee, Yokosuka (JP); Hiroyuki Fukumoto, Yokosuka (JP); Hiroyuki Shiba, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 635 days.

(21) Appl. No.: 17/043,133

(22) PCT Filed: Mar. 28, 2019

(86) PCT No.: PCT/JP2019/013895
§ 371 (c)(1),
(2) Date: Sep. 29, 2020

(87) PCT Pub. No.: WO2019/189705
PCT Pub. Date: Oct. 3, 2019

(65) Prior Publication Data
US 2021/0021053 A1    Jan. 21, 2021

(30) Foreign Application Priority Data
Mar. 30, 2018 (JP) .................... 2018-069138

(51) Int. Cl.
*H01Q 21/20* (2006.01)
*H04B 7/0456* (2017.01)
(Continued)

(52) U.S. Cl.
CPC .......... *H01Q 21/20* (2013.01); *H04B 7/0456* (2013.01); *H04J 99/00* (2022.08); *H04L 27/366* (2013.01)

(58) Field of Classification Search
CPC ....... H01Q 21/20; H04J 99/00; H04B 7/0456; H04L 27/366
(Continued)

(56) References Cited

U.S. PATENT DOCUMENTS

| 2007/0058605 A1* | 3/2007 | Meylan | ................ H04W 72/04 |
| | | | 370/449 |
| 2008/0192846 A1* | 8/2008 | Bjerke | ................ H04L 25/0212 |
| | | | 375/260 |

(Continued)

OTHER PUBLICATIONS

E.Sasaki, M.Hirabe, T.Maru, N.Zein, "Pragmatic OAM with polarization multiplexing transmission for future 5G ultra-high capacity radio", inproc.of EuMA2016,Oct. 2016.
(Continued)

*Primary Examiner* — Binh B Tran
(74) *Attorney, Agent, or Firm* — Harness, Dickey & Pierce, P.L.C.

(57) ABSTRACT

An OAM multiplexing communication system uses one or more OAM modes and multiplexes signals of one or more sequences for each OAM mode. A transmitting station includes a transmitting antenna using an M-UCA, and an OAM mode generation unit that simultaneously generates one or more OAM modes from each UCA. A receiving station includes a receiving antenna equivalent to the M-UCA, an OAM mode separation unit that separates signals received by each UCA for each OAM mode, and a received signal processing unit that estimates channel information for each OAM mode and performs an equalization process for each OAM mode by using a receiving weight calculated from the channel information. The received sig- (Continued)

nal processing unit is configured to estimate, for each OAM mode, channel information of another OAM mode causing interference and calculate the receiving weight of a subject OAM mode by using the channel information of the subject OAM mode and said another OAM mode.

10 Claims, 7 Drawing Sheets

(51) Int. Cl.
 *H04L 27/36* (2006.01)
 *H04J 99/00* (2009.01)
(58) Field of Classification Search
 USPC .......................................................... 343/853
 See application file for complete search history.

(56) References Cited

U.S. PATENT DOCUMENTS

2010/0119017 A1* 5/2010 Kim ...................... H04L 1/0662
 375/340
2013/0010889 A1* 1/2013 Ponnampalam ....... H04B 7/066
 375/267

OTHER PUBLICATIONS

International Search Report issued in PCT/JP2019/013895, dated Jun. 25, 2019.

* cited by examiner

FIG. 6

OAM MULTIPLEXING COMMUNICATION SYSTEM AND INTER-MODE INTERFERENCE ELIMINATION METHOD

CROSS-REFERENCE TO RELATED APPLICATIONS

This application is a 371 U.S. National Phase of International Application No. PCT/JP2019/013895, filed on Mar. 28, 2019, which claims priority to Japanese Application No. 2018-069138, filed on Mar. 30, 2018. The entire disclosures of the above applications are incorporated herein by reference.

TECHNICAL FIELD

The present invention relates to an OAM multiplexing communication system and an inter-mode interference elimination method that subject a radio signal to spatial multiplex transmission by using orbital angular momentum (OAM) of an electromagnetic wave.

BACKGROUND ART

There is a technique that subjects a radio signal to spatial multiplex transmission by using OAM, as a technique for improving a transmission capacity in wireless communication. An electric wave having an OAM mode has a feature that an equiphase surface thereof is distributed in a spiral form along a rotational direction centering on a propagation axis of a beam. A mode in which a cycle of the spiral formed by the equiphase surface is $2\pi \times a$ is referred to as an OAM mode a. Since different OAM modes have orthogonality in a rotational direction, it is possible to subject signals of a plurality of OAM modes to spatial multiplex transmission. For example, since a signal of an OAM mode 1 and a signal of an OAM mode 2 are orthogonal to each other on a space, it is possible to separate the signal of the OAM mode 1 and the signal of the OAM mode 2 from each other by an OAM mode separation circuit on a receiving side, even though the signals of those modes are simultaneously transmitted from a transmitting antenna. As a method for subjecting signals of OAM modes to multiplex transmission, Non-Patent Document 1 reports a method that uses a uniform circular array (UCA) in which a plurality of antenna elements are disposed circularly at an equal interval and a Butler matrix circuit.

PRIOR ART DOCUMENT

Non-Patent Document

Non-Patent Document 1: E. Sasaki, M. Hirabe, T. Maru, N. Zein, "Pragmatic OAM with polarization multiplexing transmission for future 5G ultra-high capacity radio", in proc. of

SUMMARY OF INVENTION

Problems to be Solved by the Invention

In the case of the configuration disclosed in Non-Patent Document 1, signals of respective OAM modes can be separated only in a line-of-sight situation where a transmitting UCA and a receiving UCA are disposed at positions facing each other and there is no reflected wave. However, in an actual operation, it is necessary to consider a case where the transmitting UCA and the receiving UCA are provided at fixed positions deviated from the front facing disposition, or an influence of the reflected wave or the like due to a surrounding environment. When a channel matrix between the transmitting UCA and the receiving UCA is deviated from the ideal front facing disposition due to the influence, an interference component between OAM modes remains in an output stage of the OAM mode separation circuit of the receiving side.

For example, when the receiving side tries to separate a signal of an OAM mode 1, it is possible to extract only a signal component of the OAM mode 1 when the transmitting UCA and the receiving UCA are in a state of the ideal front facing disposition. On the other hand, when the transmitting UCA and the receiving UCA are provided at fixed positions deviated from the ideal front facing disposition, or when the channel matrix is deviated from the ideal one due to the influence of the reflected wave, a propagation path, an RF circuit and the like, an interference component of another mode such as the adjacent OAM mode 2 or OAM mode 0 is superimposed on the signal component of the OAM mode 1 at a circuit output stage and thus communication quality is deteriorated, even though separation of the signal of the OAM mode 1 is tried.

Here, in a case of a conventional method (full MIMO) that performs precoding and an equalization process with respect to all signal sequences, a circuit scale and an amount of digital signal processing are exponentially increased according to the number of signal sequences, and thus it is difficult to implement.

An object of the present invention is to provide an OAM multiplexing communication system and an inter-mode interference elimination method that can suppress, with a small circuit scale and a small amount of digital signal processing, inter-mode interference caused by a deviation of an optical axis between a transmitting UCA and a receiving UCA, a tilt, a reflected wave, and the like.

Means for Solving the Problems

A first invention is directed to an OAM multiplexing communication system that uses one or more OAM modes and multiplexes signals of one or more sequences for each OAM mode. The OAM multiplexing communication system includes a transmitting station and a receiving station. The transmitting station includes: a transmitting antenna in which a plurality of UCAs having different diameters are concentrically disposed; and an OAM mode generation unit that simultaneously generates the one or more OAM modes from each UCA of the transmitting antenna. The receiving station includes: a receiving antenna that has a configuration equivalent to the M-UCA; an OAM mode separation unit that separates signals received by each UCA of the receiving antenna for each OAM mode; and a received signal processing unit that estimates channel information for each OAM mode separated from the signals received by the each UCA of the receiving antenna, and performs an equalization process for each OAM mode by using a receiving weight calculated from the channel information. The received signal processing unit is configured to estimate, for each OAM mode, channel information of another OAM mode causing interference and calculate the receiving weight of a subject OAM mode by using the channel information of the subject OAM mode and said another OAM mode.

In the OAM multiplexing communication system of the first invention, the channel information of said another OAM mode used in calculating the receiving weight by the received signal processing unit is the channel information of an OAM mode close to or adjacent to the subject OAM mode.

In the OAM multiplexing communication system of the first invention, the receiving station further includes a unit that feeds back the channel information and the receiving weight of the each OAM mode calculated by the received signal processing unit to the transmitting station. The transmitting station further includes a transmission signal processing unit that receives the channel information and the receiving weight of the each OAM mode fed back from the receiving station, calculates a transmitting weight for each OAM mode in consideration of the channel information and the receiving weight of another OAM mode causing interference, and performs precoding with respect to signals of sequences to be transmitted from the plurality of UCAs.

In the OAM multiplexing communication system of the first invention, the transmitting station further includes a transmission signal processing unit that performs precoding with respect to signals of sequences to be transmitted from the plurality of UCAs by using a transmitting weight for each OAM mode. The receiving station further includes a unit that uses the channel information and the receiving weight calculated by the received signal processing unit to calculate the transmitting weight for each OAM mode in consideration of the channel information and the receiving weight of another OAM mode causing interference, and feeds back the transmitting weight to the transmitting station.

In the OAM multiplexing communication system of the first invention, the channel information of said another OAM mode used in calculating the transmitting weight in the transmission signal processing unit is the channel information of an OAM mode close to or adjacent to the subject OAM mode.

A second invention is directed to an inter-mode interference elimination method for an OAM multiplexing communication system that uses one or more OAM modes and multiplexes signals of one or more sequences for each OAM mode. The OAM multiplexing communication system includes a transmitting station and a receiving station. The transmitting station includes: a transmitting antenna that uses an M-UCA in which a plurality of UCAs having different diameters are concentrically disposed; and an OAM mode generation unit that simultaneously generates the one or more OAM modes from each UCA of the transmitting antenna. The receiving station includes: a receiving antenna that has a configuration equivalent to the M-UCA; an OAM mode separation unit that separates signals received by each UCA of the receiving antenna for each OAM mode; and a received signal processing unit that estimates channel information for each OAM mode separated from the signals received by the each UCA of the receiving antenna, and performs an equalization process for each OAM mode by using a receiving weight calculated from the channel information. The inter-mode interference elimination method includes estimating, by the received signal processing unit, for each OAM mode, channel information of another OAM mode causing interference and calculating the receiving weight of a subject OAM mode by using the channel information of the subject OAM mode and said another OAM mode.

In the inter-mode interference elimination method of the second invention, the channel information of said another OAM mode used in calculating the receiving weight by the received signal processing unit is the channel information of an OAM mode close to or adjacent to the subject OAM mode.

In the inter-mode interference elimination method of the second invention, the receiving station feeds back the channel information and the receiving weight of the each OAM mode calculated by the received signal processing unit to the transmitting station. The transmitting station receives the channel information and the receiving weight of the each OAM mode fed back from the receiving station, calculates a transmitting weight for each OAM mode in consideration of the channel information and the receiving weight of another OAM mode causing interference, and performs precoding with respect to signals of sequences to be transmitted from the plurality of UCAs.

In the inter-mode interference elimination method of the second invention, the transmitting station performs precoding with respect to signals of sequences to be transmitted from the plurality of UCAs by using a transmitting weight for each OAM mode. The receiving station uses the channel information and the receiving weight calculated by the received signal processing unit to calculate the transmitting weight for each OAM mode in consideration of the channel information and the receiving weight of another OAM mode causing interference, and feeds back the transmitting weight to the transmitting station.

In the inter-mode interference elimination method of the second invention, the channel information of said another OAM mode used in calculating the transmitting weight is the channel information of an OAM mode close to or adjacent to the subject OAM mode.

Effect of the Invention

According to the present invention, when calculating, for each OAM mode, the receiving weight in consideration of undergoing interference and the transmitting weight in consideration of giving interference, it is possible to reduce the amount of digital signal processing depending on the number of signal sequences to be multiplexed. It is thus possible to compensate for the inter-mode interference with a simple configuration and also to improve a system capacity.

BRIEF DESCRIPTION OF DRAWINGS

FIG. 6 is a diagram showing channel information handled by feedback processing units 24 and 14.

EMBODIMENTS

Embodiment 1

Figure 1:
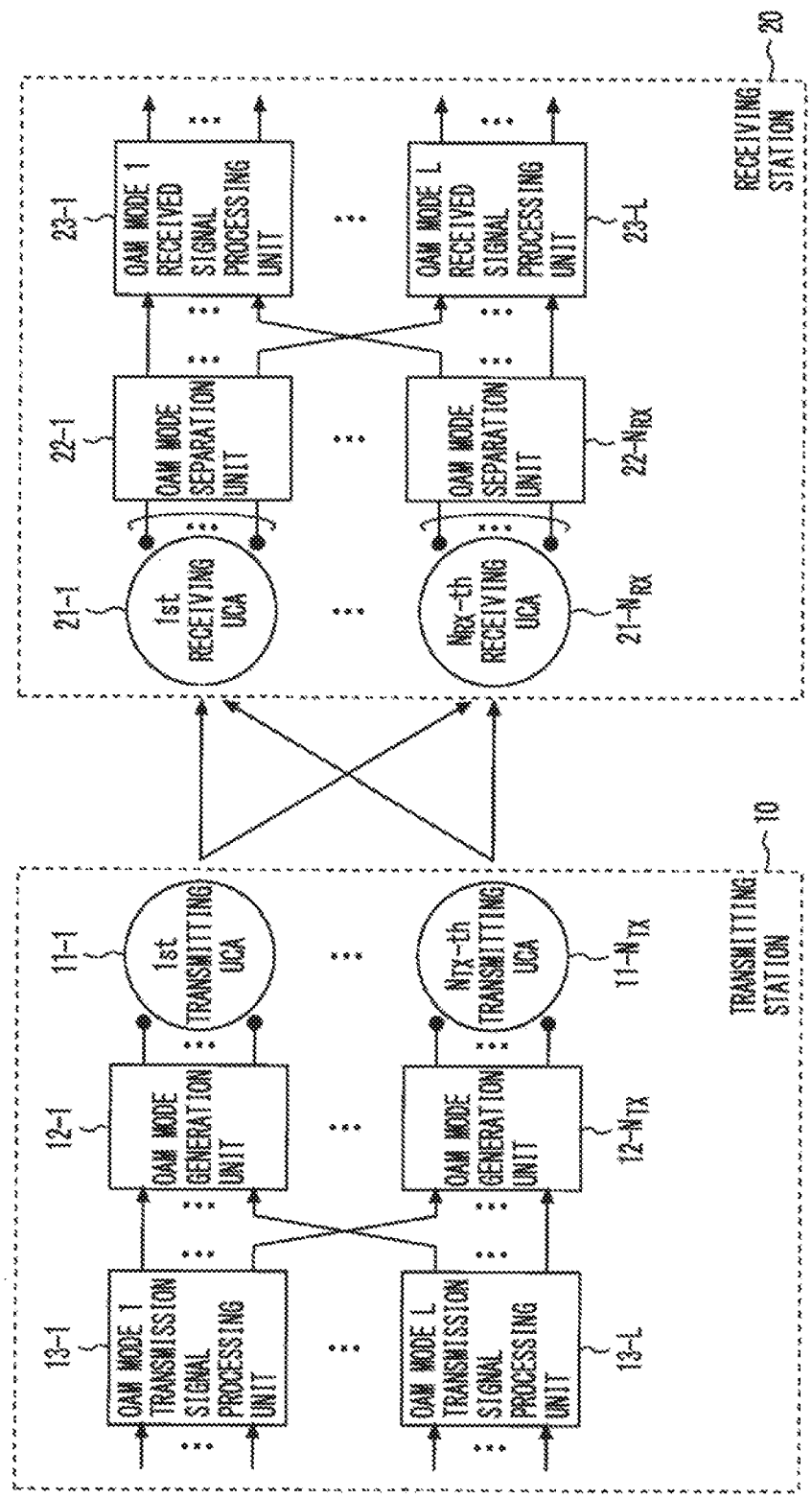
FIG. 1 is a diagram showing a configuration example of Embodiment 1 of an OAM multiplexing communication system according to the present invention.

FIG. 1 shows a configuration example of Embodiment 1 of an OAM multiplexing communication system according to the present invention.

In FIG. 1, a transmitting station 10 includes a first transmitting UCA 11-1 to an $N_{TX}$-th transmitting UCA 11-$N_{TX}$ as transmitting antennae. Here, $N_{TX}$ is an integer of 2 or greater. Modulation signals of a plurality of sequences transmitted in OAM modes 1 to L are respectively input to an OAM mode 1 transmission signal processing unit 13-1 to an OAM mode L transmission signal processing unit 13-L. Here, the numerical values 1 to L are indexes. The OAM mode 1 transmission signal processing unit 13-1 generates signals to be transmitted in the OAM mode 1 from the respective transmitting UCAs, and outputs the signals to OAM mode generation units 12-1 to 12-$N_{TX}$ respectively associated with the transmitting UCAs. Similarly, the OAM mode L transmission signal processing unit 13-L generates signals to be transmitted in the OAM mode L from the respective transmitting UCAs, and outputs the signals to the OAM mode generation units 12-1 to 12-$N_{TX}$ respectively associated with the transmitting UCAs. Each of the OAM mode generation units 12-1 to 12-$N_{TX}$ receives the signals to be transmitted in the OAM modes 1 to L, adjusts phases of the signals to be transmitted as signals in the OAM modes 1 to L from each of the transmitting UCAs 11-1 to 11-$N_{TX}$, and outputs the signals to the antenna elements of each transmitting UCA.

A receiving station 20 includes a first receiving UCA 21-1 to an $N_{RX}$-th receiving UCA 21-$N_{RX}$ as receiving antennae. Here, $N_{RX}$ is an integer of 2 or greater. Each of OAM mode separation units 22-1 to 22-$N_{RX}$ separates the signals of the OAM modes 1 to L from the signals received by each receiving UCA, and outputs the signals of the respective OAM modes to an OAM mode 1 received signal processing unit 23-1 to an OAM mode L received signal processing unit 23-L. The OAM mode 1 received signal processing unit 23-1 estimates channel information based on the signals of the OAM mode 1 separated from the signals received by each receiving UCA, performs an equalization process with respect to the signals of the OAM mode 1 by using a receiving weight calculated from the channel information, and outputs the signals of the plurality of sequences transmitted in the OAM mode 1 from each transmitting UCA. Similarly, the OAM mode L received signal processing unit 23-L estimates channel information based on the signals of the OAM mode L separated from the signals received by each receiving UCA, performs an equalization process with respect to the signals, and outputs the signals of the plurality of sequences transmitted in the OAM mode L from each transmitting UCA.

Here, L is the number of OAM modes in use. If L=5, for example, signals of the OAM modes −2, −1, 0, 1, and 2 are multiplexed and transmitted. Any one the OAM modes is hereinafter referred to as an OAM mode k. Here, k is an index.

Figure 2:
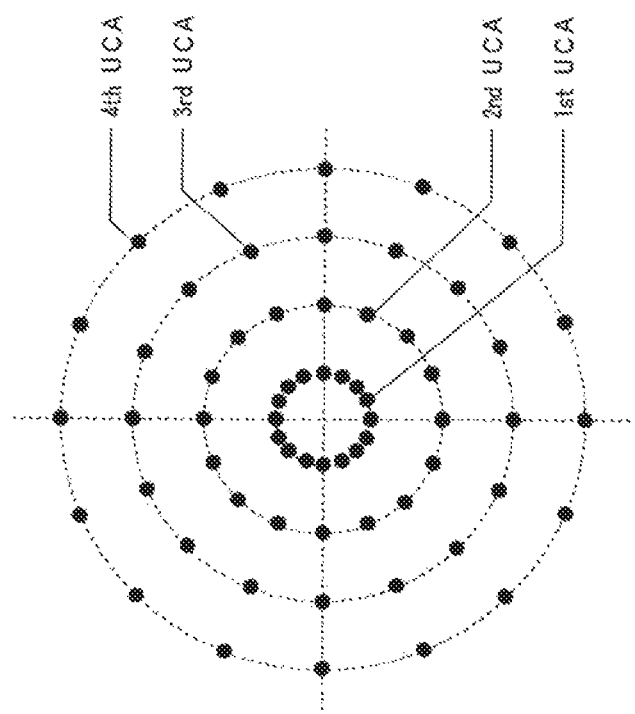
FIG. 2 is a diagram showing a configuration example of an M-UCA of the OAM multiplexing communication system according to the present invention.

The first transmitting UCA 11-1 to the $N_{TX}$-th transmitting UCA 11-$N_{TX}$ and the first receiving UCA 21-1 to the $N_{RX}$ receiving UCA 21-$N_{RX}$ constitute a multi-uniform circular array (Multi-UCA) in which a plurality of UCAs are concentrically disposed as shown in FIG. 2. Herein, a configuration in which four UCAs having different rail with each other are disposed is shown. In other words, $N_{TX}=N_{RX}=4$, and the UCAs are referred to as a first UCA, a second UCA, a third UCA, and a fourth UCA in this order from the inner UCAs. As an example, each UCA includes sixteen antenna elements indicated by · in FIG. 2, but the number of antenna elements of each UCA is not necessarily required to be the same.

Figure 3:
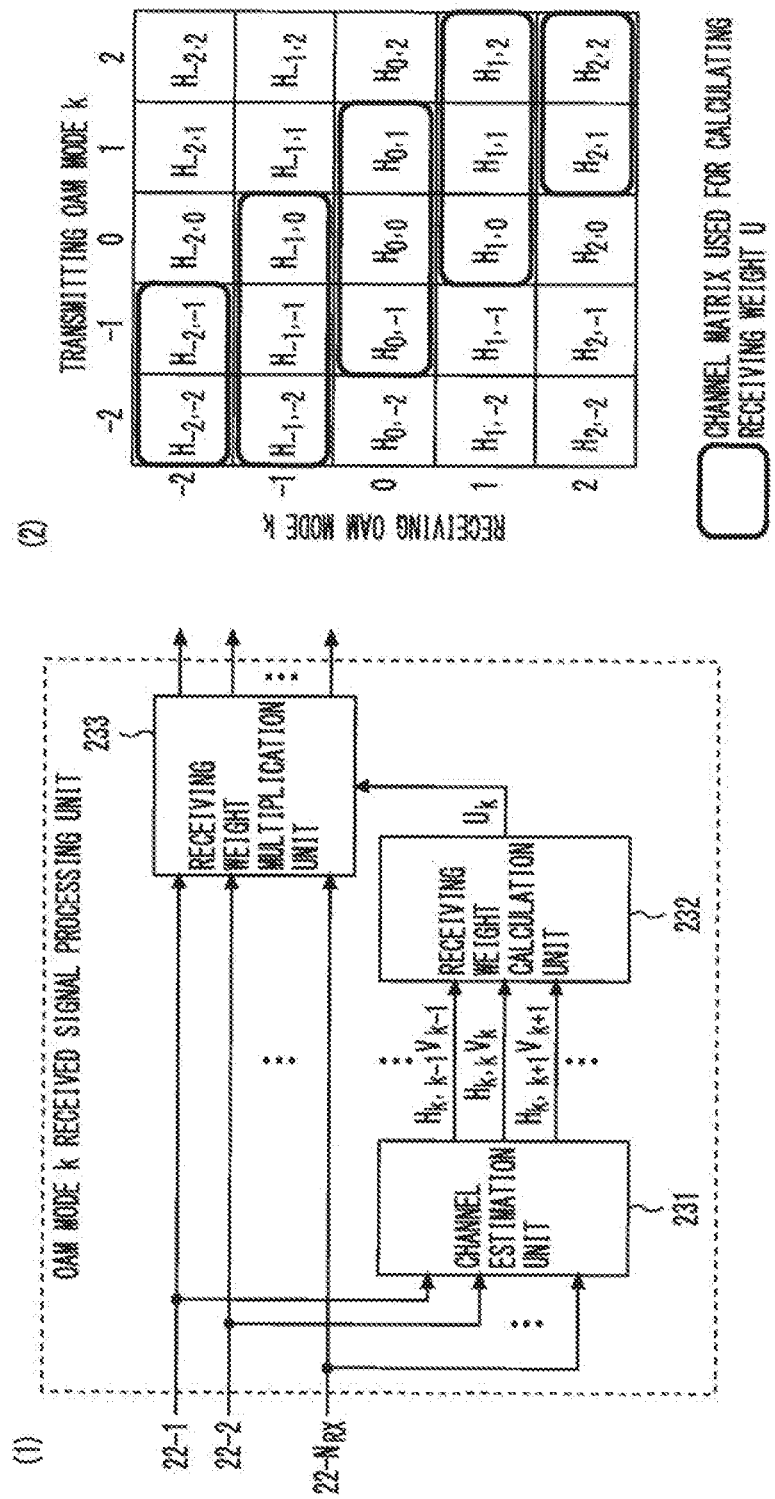
FIG. 3 is a diagram showing a configuration example of an OAM mode k received signal processing unit 23-*k*.

FIG. 3 shows a configuration example of an OAM mode k received signal processing unit 23-k.

In FIG. 3, the OAM mode k received signal processing unit 23-k includes a channel estimation unit 231, a receiving weight calculation unit 232, and a receiving weight multiplication unit 233. $N_{RX}$ signals of the OAM mode k that are respectively received by the first receiving UCA 21-1 to the $N_{RX}$ receiving UCA 21-$N_{RX}$ and are respectively separated by the OAM mode separation units 22-1 to 22-$N_{RX}$ are input to the channel estimation unit 231 and the receiving weight multiplication unit 233. The channel estimation unit 231 uses the input signals to estimate channel information ( . . . , $H_{k,k-1}V_{k-1}$, $H_{k,k+1}V_{k+1}$, . . . ) including a channel matrix H and a transmitting weight V for the received OAM mode k, and outputs the channel information to the receiving weight calculation unit 232. The receiving weight calculation unit 232 calculates a receiving weight $U_k$ for the signals of the OAM mode k based on predetermined channel information, and outputs the receiving weight to the receiving weight multiplication unit 233. The receiving weight multiplication unit 233 performs an equalization process with respect to the $N_{RX}$ signals of the OAM mode k by using the receiving weight $U_k$, and outputs the signals of the plurality of sequences transmitted in the OAM mode k.

The channel matrix H between the transmitting OAM mode and the receiving OAM mode is shown in (2) of FIG. 3. Here, an example in a case of the OAM modes −2, −1, 0, 1, and 2 is shown. In an ideal situation where the transmitting UCA and the receiving UCA are disposed to completely face each other, signals of the respective OAM modes are orthogonal to each other, and thus only a diagonal block component $H_{k,k}$ is present. However, in a situation where inter-mode interference occurs due to displacement, incompleteness of an analog circuit, and the like, the channel estimation is performed in further consideration of a non-diagonal block component $H_{k,k-1}$ during the equalization process with respect to the signals of the OAM mode k, and thereby the receiving weight $U_k$ for suppressing interference with the OAM mode k from adjacent OAM modes k−1 and k+1 is calculated.

$H_{k,k-1}$ and $H_{k,k+1}$ with respect to $H_{k,k}$ are channel matrixes of the adjacent OAM modes k−1 and k+1 giving interference to the OAM mode k, and are used together with the channel matrix $H_{k,k}$ for calculating the receiving weight $U_k$ of the OAM mode k.

The receiving weight $U_k$ associated with the OAM mode k based on the MMSE criterion is expressed by the following equation, where noise is indicated by σ and a unit matrix is indicated by I.

$$U_k = (\Sigma_n H_{k,n} V_n V_n^{HH_{k,n}H} + \sigma 2I)^{-1} H_{k,k} V_k \quad (1)$$

The receiving weight $U_k$ associated with the OAM mode k based on the ZF criterion is expressed by the following equation.

$$U_k = (\Sigma_n H_{k,n} V_n V_n^{HH_{k,n}H})^{-1} H_{k,k} V_k \quad (2)$$

Here, if k=0, and n=−1, 0, and 1, the receiving weight calculation unit 232 shown in FIG. 3 calculates the receiving weight $U_0$ for the signals of the OAM mode 0 by using the channel information ($H_{0,-1}V_{-1}$, $H_{0,0}V_0$, $H_{0,+1}V_{+1}$) output from the channel estimation unit 231.

The OAM mode 1 received signal processing unit 23-1 to the OAM mode L received signal processing unit 23-L shown in FIG. 1 execute the above-described processes in parallel to multiply the receiving weights $U_1$ to $U_L$ for the signals of the OAM modes 1 to L and thereby suppress interference from the adjacent modes. Although the above description relates to only adjacent modes, the same applies to a case where an adjacent range is expanded.

Embodiment 2

Figure 4:
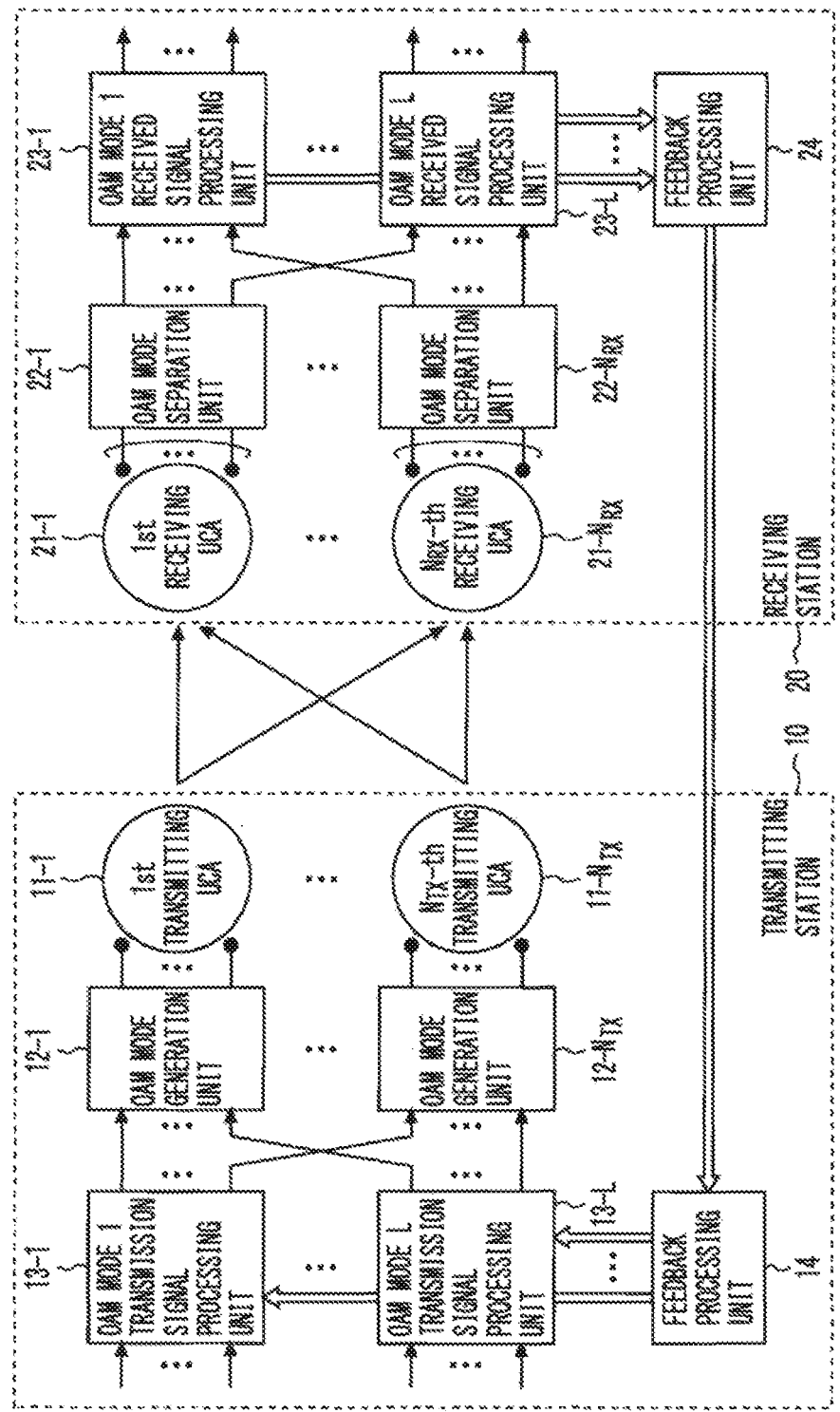
FIG. 4 is a diagram showing a configuration example of Embodiment 2 of the OAM multiplexing communication system according to the present invention.

FIG. 4 shows a configuration example of Embodiment 2 of the OAM multiplexing communication system according to the present invention.

In FIG. 4, the transmitting station 10 of Embodiment 2 is configured to make the receiving station 20 feed back the acquired channel matrix H and receiving weights $U_1$ to $U_L$ for the respective OAM modes, and to calculate the next transmitting weights $V_1$ to $V_L$ used for the precoding in the OAM mode 1 transmission signal processing unit 13-1 to the OAM mode L transmission signal processing unit 13-L. Herein, necessary information described below is fed back from a feedback processing unit 24 of the receiving station 20 to a feedback processing unit 14 of the transmitting station 10.

Figure 5:
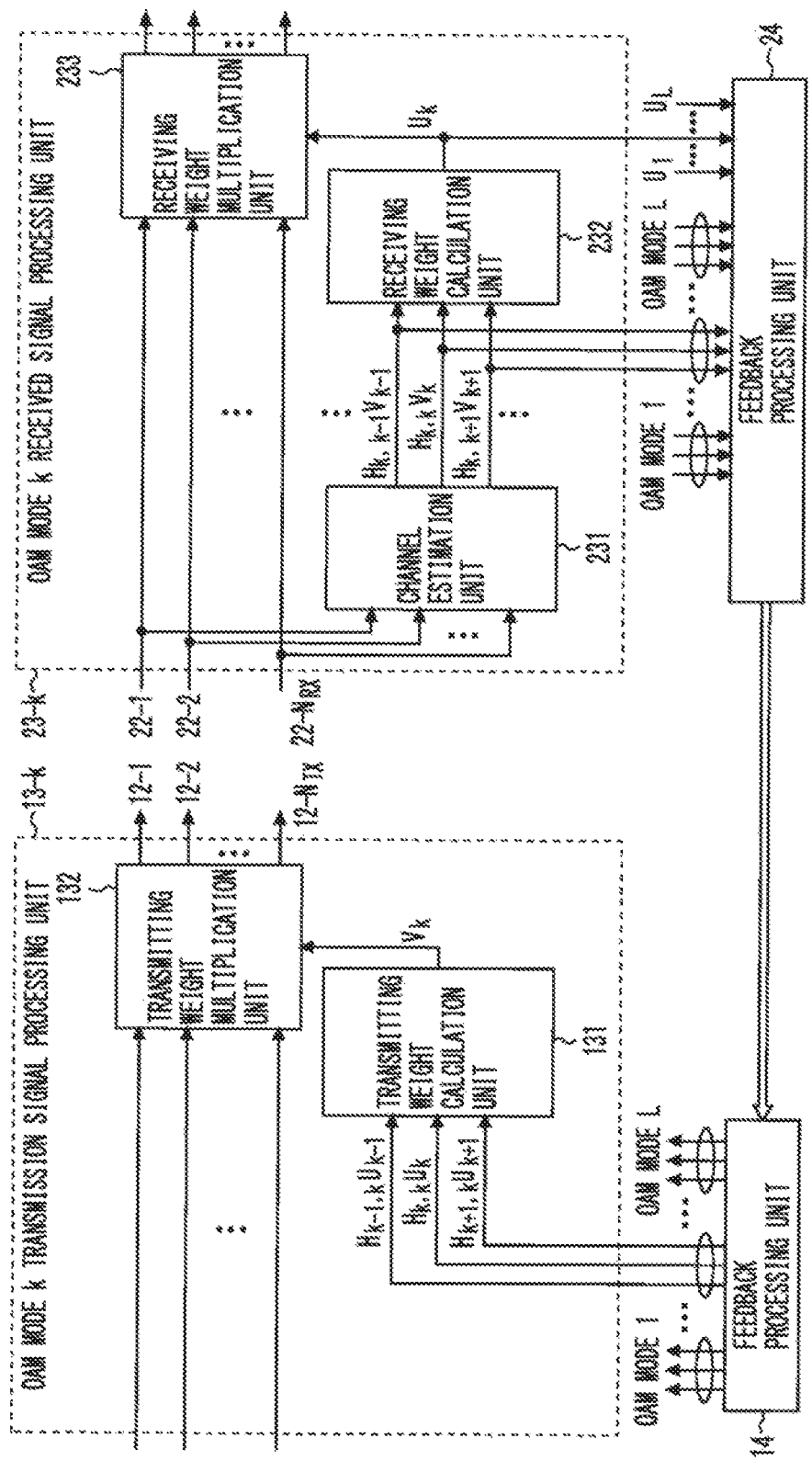
FIG. 5 is a diagram showing a configuration example 1 of an OAM mode k transmission signal processing unit 13-*k* and an OAM mode k received signal processing unit 23-*k*.

FIG. 5 shows a configuration example 1 of the OAM mode k transmission signal processing unit 13-k and the OAM mode k received signal processing unit 23-k.

In FIG. 5, the OAM mode k received signal processing unit 23-k has the same configuration as that shown in FIG. 3. The feedback processing unit 24 receives the channel matrix ( . . . , $H_{k,k-1}$, $H_{k,k}$, $H_{k,k+1}$, . . . ) associated with the receiving OAM mode k from the channel estimation unit 231 and the receiving weight Uk from the receiving weight calculation unit 232. Similarly, the channel matrixes H associated with the receiving OAM modes 1 to L and the receiving weights $U_1$ to $U_L$ are input to the feedback processing unit 24 from the OAM mode 1 received signal processing unit 23-1 to the OAM mode L received signal processing unit 23-L, respectively, and are further fed back to the feedback processing unit 14 of the transmitting station 10 from the feedback processing unit 24.

The OAM mode k transmission signal processing unit 13-k includes a transmitting weight calculation unit 131 and a transmitting weight multiplication unit 132. $N_{TX}$ modulation signals transmitted in the OAM mode k are input to the transmitting weight multiplication unit 132. The channel information ($H_{k-1,kUk-1}$, $H_{k,kUk}$, $H_{+1,kUk+1}$) including the channel matrix H and the receiving weight U associated with the transmitting OAM mode k and fed back to the feedback processing unit 14 is input to the transmitting weight calculation unit 131, and a transmitting weight $V_k$ for signals of the OAM mode k is calculated and is output to the transmitting weight multiplication unit 132. The transmitting weight multiplication unit 132 performs precoding with respect to $N_{Tx}$ signals of the OAM mode k by using the transmitting weight $V_k$, and outputs the signals to the OAM mode generation units 12-1 to 12-$N_{TX}$.

Figure 6:
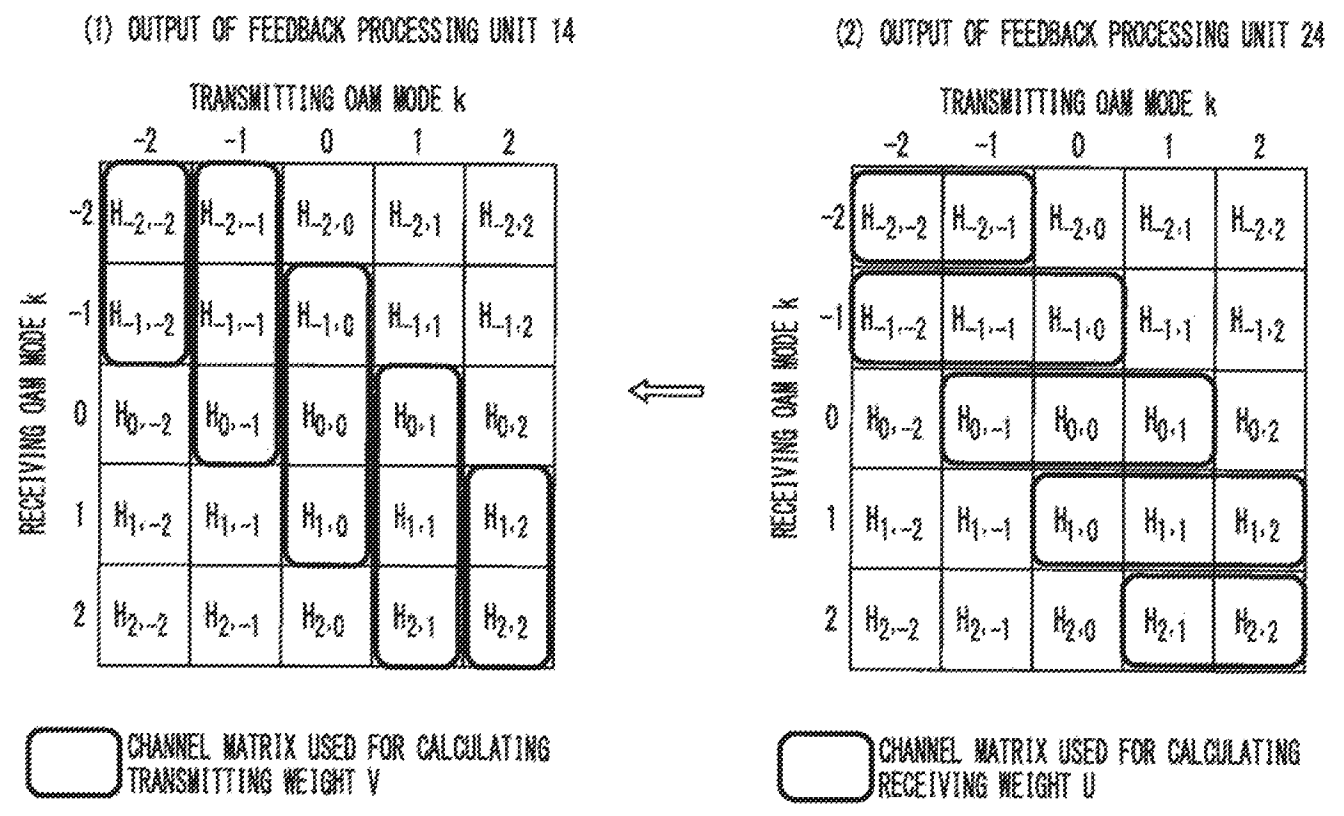

FIG. 6 shows a relationship between the channel matrix used for calculate the receiving weight $U_k$ and the channel matrix used for calculating the transmitting weight $V_k$. Here, an example in the case of the OAM modes −2, −1, 0, 1, and 2 is shown. Either of the feedback processing units 24 and 14 rearranges the channel matrix used for calculating the receiving weight $U_k$ to the channel matrix used for calculating the transmitting weight $V_k$.

$H_{k,k-1}$ and $H_{k,k+1}$ with respect to $H_{k,k}$ are channel matrixes of the adjacent OAM modes k−1 and k+1 giving interference to the OAM mode k, and are used together with the channel matrix $H_{k,k}$ for calculating the transmitting weight $V_k$ of the OAM mode k.

The transmitting weight $V_k$ associated with the OAM mode k based on the MMSE criterion is expressed by the following equation.

$$V_k = (\Sigma_m H_{m,k}^{HU_m W_k U_m H_{m,k}} + \mu I)^{-1} H_{k,k} U_k W_k \quad (3)$$

Here, $W_k = (I - U_k^{HH_k,kV_k})^{-1}$, and μ is a solution of the following equation.

$$\Sigma_k Tr((\Lambda_k + \mu I)^{-2} \sigma_k) = P$$

$$\varphi_k = D_k^{H(H_k,k H U_k W_k 2 U_k H H_k,k) D_k}$$

P is transmission power, and Dk and Λk are respectively an eigenvector matrix and a diagonal matrix formed of eigenvalues that are obtained through eigenvalue decomposition of the following expression.

$$\Sigma_m H_{m,k}^{HU_m W_k U_m HH_{m,k}}$$

It should be noted that $W_k$ may be set as follows according to an equalization algorithm.

$$W_k = I + SINR_k$$

Here, I is a unit matrix with the same size as that of $SINR_k$. $SINR_k$ is a diagonal matrix that has, as diagonal components, SINR of signals of the OAM mode k obtained when the transmitting weight $V_k$ and the receiving weight $U_k$ are used.

The transmitting weight $V_k$ associated with the OAM mode k based on the ZF criterion is expressed by the following equation.

$$V_k = (\Sigma_m H_{m,k}^{HU_m W_k U_m HH_{m,k}})^{-1} H_{k,k} U_k W_k \quad (4)$$

Here, if k=0, and m=−1, 0, and 1, the transmitting weight calculation unit 131 shown in FIG. 5 calculates the transmitting weight $V_0$ for the signals transmitted in the OAM mode 0 by using the channel information ($H_{-1,0}V_{-1}$, $H_{0,0}V_0$, $H_{+1,0}V_{+1}$) fed back thereto.

The OAM mode 1 transmission signal processing unit 13-1 to the OAM mode L transmission signal processing unit 13-L shown in FIG. 4 execute the above-described processes in parallel to multiply the transmitting weights $V_1$ to $V_L$ for the signals of the OAM modes 1 to L and thereby execute the precoding process that suppresses interference with the adjacent modes. Although the above description relates to only adjacent modes, the same applies to a case where an adjacent range is expanded.

Figure 7:
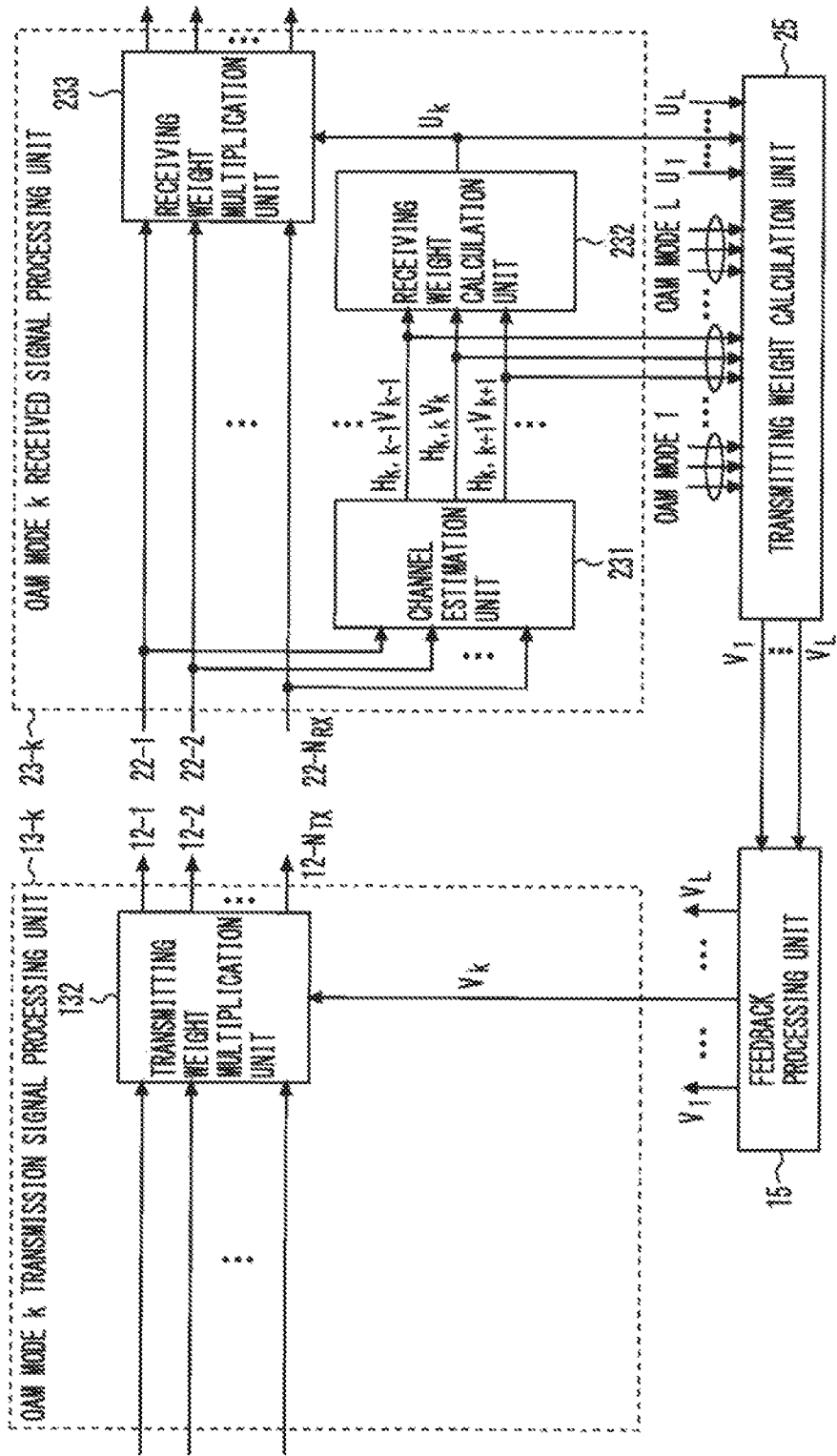
FIG. 7 is a diagram showing a configuration example 2 of the OAM mode k transmission signal processing unit 13-*k* and the OAM mode k received signal processing unit 23-*k*.

FIG. 7 shows a configuration Embodiment 2 of the OAM mode k transmission signal processing unit 13-k and the OAM mode k received signal processing unit 23-k.

In FIG. 7, a transmitting weight calculation unit 25 provided in the receiving station receives the channel matrixes H and the receiving weights $U_1$ to $U_L$ associated with the receiving OAM modes 1 to L respectively from the OAM mode 1 received signal processing unit 23-1 to the OAM mode L received signal processing unit 23-L, and calculates the transmitting weights $V_1$ to $V_L$ respectively used by the transmitting weight multiplication units 132 of the OAM mode 1 transmission signal processing unit 13-1 to the OAM mode L transmission signal processing unit 13-L of the transmitting station. The transmitting weights $V_1$ to $V_L$ are fed back to a feedback processing unit 15 of the transmitting station from the transmitting weight calculation unit 25, and are further output to the transmitting weight multiplication units 132 of the OAM mode 1 transmission signal processing unit 13-1 to the OAM mode L transmission signal processing unit 13-L, respectively.

It should be noted that, in the configurations shown in FIGS. 4, 5, and 7, the process of performing the precoding by calculating the transmitting weight for the transmitting station by the use of the channel information and the receiving weight estimated in the receiving station may be repeatedly performed until an amount of change in a channel capacity (weight evaluation function), which is every time obtained by using the receiving weight and the transmitting weight, from the previous value becomes equal to or less than a predetermined threshold value.

REFERENCE SIGNS LIST 11-1 TO 11-$N_{TX}$ FIRST TRANSMITTING UCA TO $N_{TX}$-TH TRANSMITTING UCA
12-1 TO 12-$N_{TX}$ OAM MODE GENERATION UNIT
13-1 OAM MODE 1 TRANSMISSION SIGNAL PROCESSING UNIT
13-L OAM MODE L TRANSMISSION SIGNAL PROCESSING UNIT
131 TRANSMITTING WEIGHT CALCULATION UNIT
132 TRANSMITTING WEIGHT MULTIPLICATION UNIT
14, 15 FEEDBACK PROCESSING UNIT
21-1 TO 21-$N_{RX}$ FIRST RECEIVING UCA TO $N_{Rx}$-th RECEIVING UCA
22-1 TO 22-$N_{RX}$ OAM MODE SEPARATION UNIT
23-1 OAM MODE 1 RECEIVED SIGNAL PROCESSING UNIT
23-L OAM MODE L RECEIVED SIGNAL PROCESSING UNIT
231 CHANNEL ESTIMATION UNIT
232 RECEIVING WEIGHT CALCULATION UNIT
233 RECEIVING WEIGHT MULTIPLICATION UNIT
24 FEEDBACK PROCESSING UNIT
25 TRANSMITTING WEIGHT CALCULATION UNIT

The invention claimed is:

1. An OAM multiplexing communication system that uses one or more orbital angular momentum (OAM) modes and multiplexes signals of one or more sequences for each OAM mode, the OAM multiplexing communication system comprising:
a transmitting station including:
a transmitting antenna that uses an M-UCA in which a plurality of uniform circular arrays (UCAs) having different diameters are concentrically disposed, each UCA having a plurality of antenna elements disposed circularly at an equal interval; and
an OAM mode generation unit that simultaneously generates the one or more OAM modes from each UCA of the transmitting antenna; and
a receiving station including:
a receiving antenna that has a configuration equivalent to the M-UCA;
an OAM mode separation unit that separates signals received by each UCA of the receiving antenna for each OAM mode; and
a received signal processing unit that estimates channel information for each OAM mode separated from the signals received by the each UCA of the receiving antenna, and performs an equalization process for each OAM mode by using a receiving weight calculated from the channel information, wherein
the received signal processing unit is configured to estimate, for each OAM mode, channel information of another OAM mode causing interference and calculate the receiving weight of a subject OAM mode by using the channel information of the subject OAM mode and said another OAM mode.

2. The OAM multiplexing communication system according to claim 1, wherein
the channel information of said another OAM mode used in calculating the receiving weight by the received signal processing unit is the channel information of an OAM mode close to or adjacent to the subject OAM mode.

3. The OAM multiplexing communication system according to claim 1, wherein
the receiving station further includes a unit that feeds back the channel information and the receiving weight of the each OAM mode calculated by the received signal processing unit to the transmitting station, and
the transmitting station further includes a transmission signal processing unit that receives the channel information and the receiving weight of the each OAM mode fed back from the receiving station, calculates a transmitting weight for each OAM mode in consideration of the channel information and the receiving weight of another OAM mode causing interference, and performs precoding with respect to signals of sequences to be transmitted from the plurality of UCAs.

4. The OAM multiplexing communication system according to claim 1, wherein
the transmitting station further includes a transmission signal processing unit that performs precoding with respect to signals of sequences to be transmitted from the plurality of UCAs by using a transmitting weight for each OAM mode, and
the receiving station further includes a unit that uses the channel information and the receiving weight calculated by the received signal processing unit to calculate the transmitting weight for each OAM mode in consideration of the channel information and the receiving weight of another OAM mode causing interference, and feeds back the transmitting weight to the transmitting station.

5. The OAM multiplexing communication system according to claim 3, wherein
the channel information of said another OAM mode used in calculating the transmitting weight in the transmission signal processing unit is the channel information of an OAM mode close to or adjacent to the subject OAM mode.

6. An inter-mode interference elimination method for an OAM multiplexing communication system that uses one or more orbital angular momentum (OAM) modes and multiplexes signals of one or more sequences for each OAM mode, wherein
the OAM multiplexing communication system comprises:
a transmitting station including:
a transmitting antenna that uses an M-UCA in which a plurality of uniform circular arrays (UCAs) having different diameters are concentrically disposed, each UCA having a plurality of antenna elements disposed circularly at an equal interval; and
an OAM mode generation unit that simultaneously generates the one or more OAM modes from each UCA of the transmitting antenna; and a receiving station including:
- a receiving antenna that has a configuration equivalent to the M-UCA;
- an OAM mode separation unit that separates signals received by each UCA of the receiving antenna for each OAM mode; and
- a received signal processing unit that estimates channel information for each OAM mode separated from the signals received by the each UCA of the receiving antenna, and performs an equalization process for each OAM mode by using a receiving weight calculated from the channel information, wherein the inter-mode interference elimination method comprises:

estimating, by the received signal processing unit, for each OAM mode, channel information of another OAM mode causing interference and calculating the receiving weight of a subject OAM mode by using the channel information of the subject OAM mode and said another OAM mode.

7. The inter-mode interference elimination method according to claim 6, wherein
the channel information of said another OAM mode used in calculating the receiving weight by the received signal processing unit is the channel information of an OAM mode close to or adjacent to the subject OAM mode.

8. The inter-mode interference elimination method according to claim 6, wherein
the receiving station feeds back the channel information and the receiving weight of the each OAM mode calculated by the received signal processing unit to the transmitting station, and
the transmitting station receives the channel information and the receiving weight of the each OAM mode fed back from the receiving station, calculates a transmitting weight for each OAM mode in consideration of the channel information and the receiving weight of another OAM mode causing interference, and performs precoding with respect to signals of sequences to be transmitted from the plurality of UCAs.

9. The inter-mode interference elimination method according to claim 6, wherein
the transmitting station performs precoding with respect to signals of sequences to be transmitted from the plurality of UCAs by using a transmitting weight for each OAM mode, and
the receiving station uses the channel information and the receiving weight calculated by the received signal processing unit to calculate the transmitting weight for each OAM mode in consideration of the channel information and the receiving weight of another OAM mode causing interference, and feeds back the transmitting weight to the transmitting station.

10. The inter-mode interference elimination method according to claim 8, wherein
the channel information of said another OAM mode used in calculating the transmitting weight is the channel information of an OAM mode close to or adjacent to the subject OAM mode.

* * * * *